Aug. 29, 1933.    R. A. BABEL    1,924,590
BRAKE SHOE
Filed Dec. 6, 1928    4 Sheets-Sheet 1

Aug. 29, 1933.          R. A. BABEL          1,924,590
BRAKE SHOE
Filed Dec. 6, 1928          4 Sheets-Sheet 2
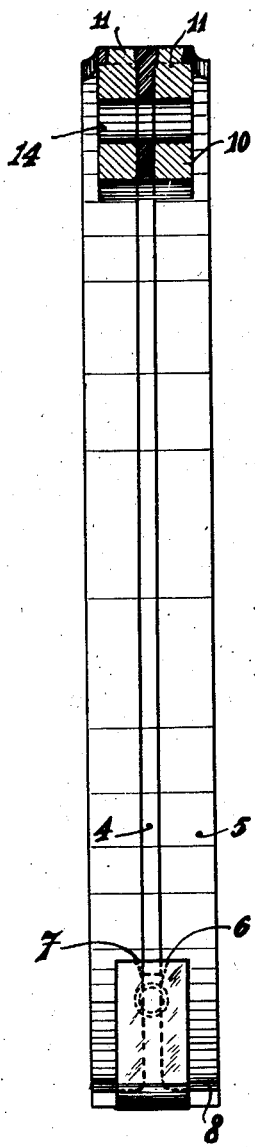
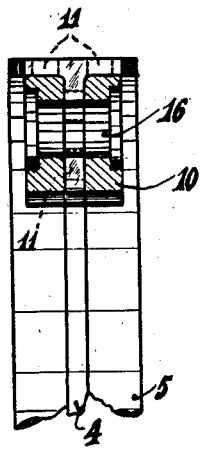
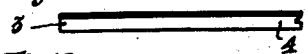
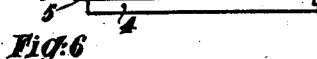
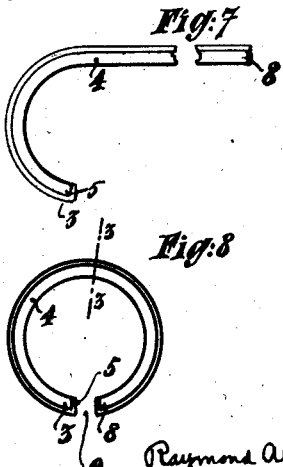
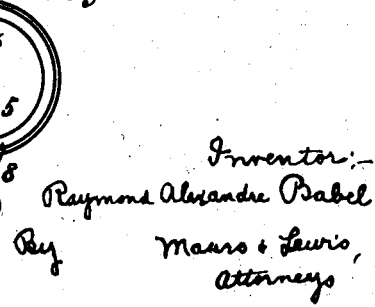
Inventor:—
Raymond Alexandre Babel
By Mauro & Lewis,
Attorneys Aug. 29, 1933.     R. A. BABEL     1,924,590
BRAKE SHOE
Filed Dec. 6, 1928     4 Sheets-Sheet 3
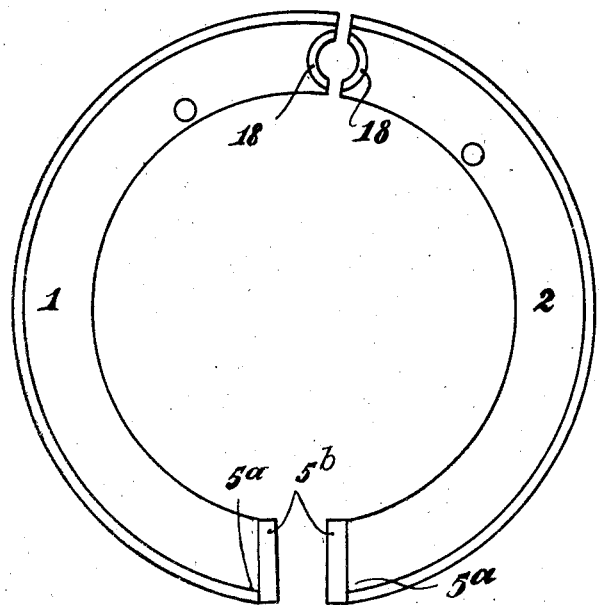
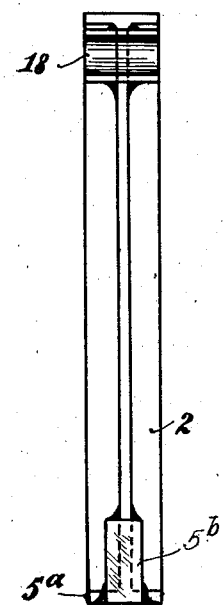
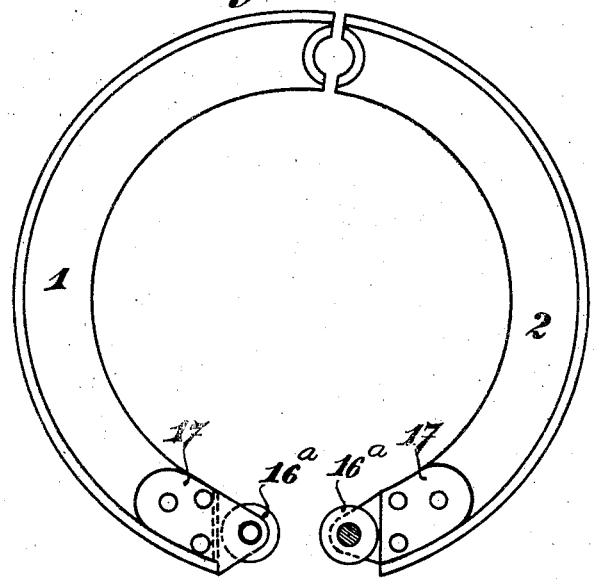
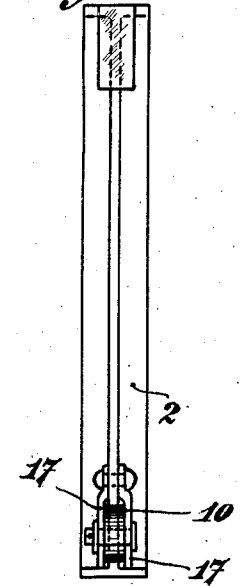

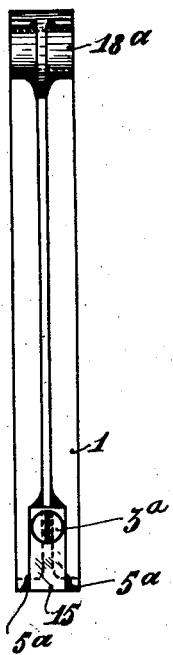
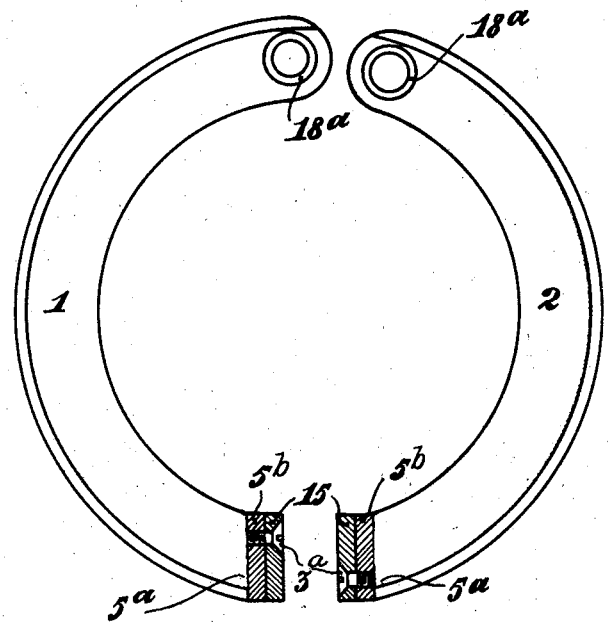
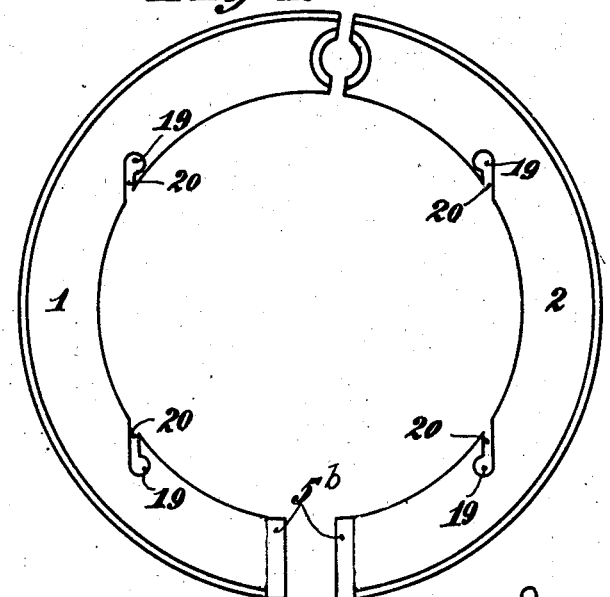

Patented Aug. 29, 1933

1,924,590

UNITED STATES PATENT OFFICE 1,924,590

BRAKE SHOE

Raymond Alexandre Babel, Clichy, France, assignor, by mesne assignments, to Bendix Brake Company, South Bend, Ind., a corporation of Illinois Application December 6, 1928, Serial No. 324,198, and in France December 12, 1927

6 Claims. (Cl. 188—250)

The present invention relates to the manufacture of expanding members or shoes for the brakes of motor or other vehicles.

At the present time, the brake shoes comprise two or more friction members manufactured by the casting process, and consist of aluminium, cast iron or steel, or like cast metal.

Such pieces can also be manufactured by the punching process, but since it is an essential point to obtain a shoe having the form of an I or T, the punching must be performed in two operations thus forming in the first place two pieces of right-angled cross section and then assembling them by riveting or electric welding.

The present invention relates to an improved process obviating the defects inherent in the other two, and the articles can thus be made stronger as well as less expensive.

In the present process, a piece having an I or a T section is employed. The web is cut at the ends upon a length equal to its height, after which the flange is bent down upon the cut part, and the piece is suitably curved.

The invention further relates to the following points:

A.—The arrangement of the plate or of rollers at the ends of the shoes which are adapted to make contact with the brake controlling member.

B.—The use, for ordinary brakes of the double shoe type, of one or more tubes or lathe-turned members which are placed in position and are soldered to the ends of said shoes, as a substitute for the aluminium boss employed.

The following description with reference to the accompanying drawings which are given by way of example show the manner in which the said invention may be carried into effect.

Figure 2 is a section on the line 2—2 of Figure 1.

Figure 3 is a section on the line 3—3 of Figure 1.

Figures 4 to 8 illustrate the successive steps of the process converting a straight T-bar (or bar of other suitable cross-section) into a ring capable of being formed into two brake shoes; Figs. 4, 5 and 6 being side views of part of a straight bar at different stages of the process, Fig. 7 a similar view of the bar partly bent into a ring, and Fig. 8 a like view of the completely formed ring.

Figures 9 and 10 are respectively front and side views of a shoe comprising separately secured plates and a soldered or welded tube.

Figures 11 and 12 are corresponding views of a modification.

Figures 13 and 14 show a second modification in which the said plates are replaced by rollers.

Figure 15 is a diagrammatic view showing a method of attaching the springs to the shoes.

Figures 16 and 17 are diagrammatic views relating to two other methods of manufacturing the shoes.

Figure 1:
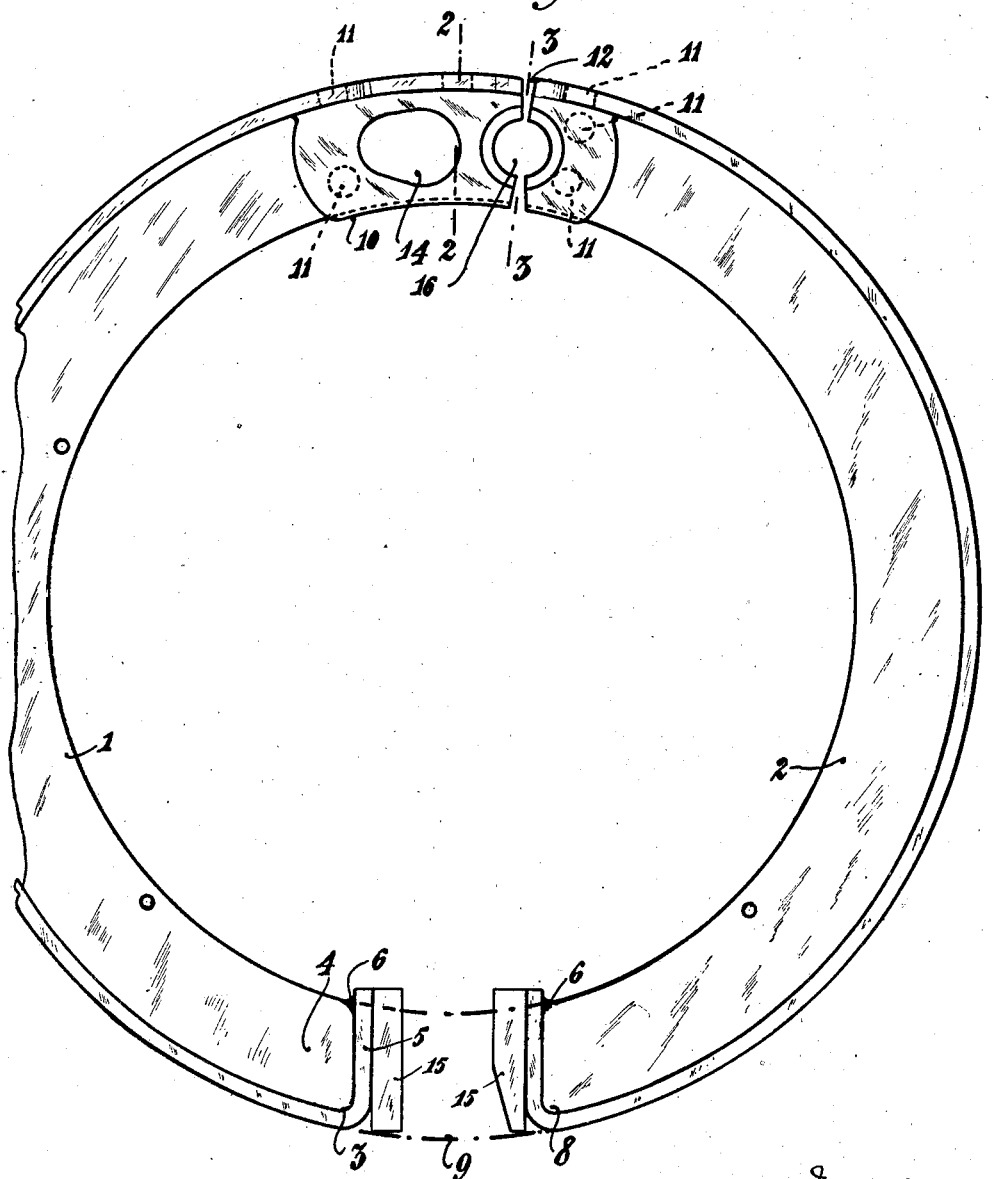
Figure 1 is a plan view of the two expanding members.

The expanding members or shoes, which are herein supposed to be two in number by way of example, consist in the first place of a length of iron or other metal of T section, of form and thickness such as may be found in general use, as illustrated in Fig. 4. At one end 3 of the said piece, the web 4 is cut away upon length equal to its height as illustrated in Figure 5, and then, while in the hot state, the flange 5 is bent upon the web as illustrated in Figure 6, and it is secured on either side of the flange 5 by two points of autogenous welding 6 and 7 as shown in Figures 1 and 2.

By means of a known process, for instance by the use of a template or support consisting of disks of the proper diameter, about which is movable a roller mounted in a forked bracket rotatable about the shaft upon which the disks are mounted, there is rolled or bent the said bar which is brought to a white heat, it being thus brought to the given diameter, at the other end of the bar the web is cut off, and the flange is then bent down and secured by welding, as for the first-mentioned end 3.

The resulting member illustrated in Figure 8 has the form of a ring with a gap at 9 and offering two oppositely situated flat faces. Upon the said flat faces 5 are disposed in any suitable manner for instance by soldering or welding, or otherwise secured plates or ramps 15 adapted to cooperate with the brake cam which is mounted between the said plates. Obviously, the cam may act directly on the flat faces 5. To employ the said member to form brake shoes, that is to make it capable of being provided with a pivot axle, stops and the like, it is necessary to form by the casting process in a suitable part a boss 10 of aluminium, or of another metal applied by casting on the piece as illustrated in Figures 1, 2 and 3, it being held upon the latter by the use of the preliminarily pierced holes 11.

In the boss are then pierced holes 14 as in Figures 1, 2 and 3 and also a hole 16 adapted to act as a socket for a pivot member, and the piece is then cut in two, as shown at 12 to form two expanding members or shoes 1 and 2, as represented in Figures 1, 2 and 3.

In the modification shown in Figures 9 and 10, the T bar or the like is cut throughout the whole of the flange and web, and to the ends of the bar are secured the plates 5$^b$ which are soldered or welded upon the web at 5$^a$.

The said plates may be in direct contact with the cam as shown in Figures 9 and 10 or may be faced by suitable wear plates secured in position by suitable means, for instance by the screws 3$^a$ as illustrated in Figures 11 and 12.

In the modification shown in Figures 9 and 10, relating chiefly to brakes of a cheap construction, the flange may consist of cement steel and may be subjected to the tempering operation at the temperature to which they are brought by the heat of the torch when soldering or welding the same to the web of the bar.

Instead of the wear plates, the ends of the shoes may be provided with the rollers 16$^a$ mounted in forked brackets 17 riveted or soldered by the arc or by autogenous welding to the web of the shoes 1 and 2 as shown in Figures 13 and 14. I have hereabove specified with reference to Figures 1 to 3, that I prefer to secure separately an aluminium boss at the pivoting point of the shoes. But my invention has further for its object a substitution, for this boss. In ordinary brakes with two expanding members, for example, one or more lathe-turned tubes are placed in position and are secured by autogenous welding, electric welding, or like process, at the suitable points on the web of the bar representing the shoes 1 and 2.

Figures 9 and 10 are relative to a method for the pivoting of the shoes, in which a half-tube 18 is soldered or welded to the respective ends of each shoe upon the web.

The pivoting arrangement may also be obtained as shown in Figures 11 and 12, by soldering or welding a tube 18$^a$.

The expanding members or shoes may also be constructed by the use of two angle bars which are assembled, before or after bending, by means of rivets or electric welding points. When the piece is finished it will have a T section as shown in Figure 16, or the piece may have a U section and may be given the form shown in Figure 17.

The invention further relates to a particular method of attaching the springs as shown in Figure 15. The shoes 1 and 2 are pierced with the holes 19 which are somewhat offset with respect to the slots 20, so that the return springs, not shown, may be secured in the holes 19 and may be released at will, after the manner of a bayonet joint.

It is obvious that all of the aforesaid arrangements are applicable not only to the manufacture of entire shoes or half-shoes, but also to the manufacture of portions of shoes, such as ¼ shoe, ⅓ shoe, ½ shoe and the like.

The pivot joint of the shoes may be constructed in any suitable manner, and in particular it is feasible to employ any separately secured piece disposed upon the web or flange of the bar, such as a piece of malleable cast-iron die-pressed steel, aluminium, or the like.

Where in the following claims a bar of T-shaped cross section is specified, it is to be understood that a bar having an I or a U cross section might be substituted.

Obviously, the said invention is susceptible of various modifications in detail without departing from the principle of the invention.

What I claim is:

1. A brake-shoe formed of a steel bar having a web and a flange, said shoe comprising two approximately semi-circular segments, each segment having a plate welded at one end thereof and a section of tube welded to the other end.

2. A brake shoe comprising a steel bar of T-shaped cross section bent to form a segment, a transverse plate secured to one end of the segment and the section of a tube secured to the other end of the segment.

3. A brake shoe comprising a steel bar of T-shaped cross section bent to provide a segment, a transverse plate secured to one end of the segment and a semi-cylindrical section of a tube embraced by the other end of the segment.

4. A brake shoe comprising a steel bar of T-shaped cross section bent to form a segment, said segment at one end having a portion of its web removed and having its flange folded sharply against and welded to the end of said web, a wear plate secured to said bent flange portion, and a portion of a tube secured to the other end of said segment.

5. A brake shoe comprising a steel bar of T-shaped cross section bent to form a segment, said segment at one end having a portion of its web removed and having its flange folded sharply against and welded to the end of said web, a wear plate secured to said bent flange portion, and a portion of a tube welded to the other end of said segment.

6. A brake shoe formed of a steel bar of T-shape in cross section comprising a semi-circular segment having a transverse plate welded at one end thereof, a counterplate fastened to said transverse plate and a sectional tube welded to the other end of said segment.

RAYMOND ALEXANDRE BABEL.